United States Patent
Hong

(10) Patent No.: US 11,206,609 B2
(45) Date of Patent: Dec. 21, 2021

(54) CELL ACCESS METHOD AND APPARATUS AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/956,459

(22) PCT Filed: Dec. 22, 2017

(86) PCT No.: PCT/CN2017/118014
§ 371 (c)(1),
(2) Date: Jun. 19, 2020

(87) PCT Pub. No.: WO2019/119421
PCT Pub. Date: Jun. 27, 2019

(65) Prior Publication Data
US 2021/0099947 A1    Apr. 1, 2021

(51) Int. Cl.
*H04W 48/16* (2009.01)
*H04W 76/27* (2018.01)
(Continued)

(52) U.S. Cl.
CPC ......... *H04W 48/16* (2013.01); *H04W 4/027* (2013.01); *H04W 48/08* (2013.01);
(Continued)

(58) Field of Classification Search
CPC ..... H04W 36/32; H04W 48/04; H04W 52/28; H04W 52/282; H04W 4/027;
(Continued)

(56) References Cited

U.S. PATENT DOCUMENTS 9,654,931 B2 * 5/2017 Wang ............... H04W 48/18
9,736,743 B2 * 8/2017 Hahn ............... H04W 36/04
(Continued)

FOREIGN PATENT DOCUMENTS

CN    101583169 A    11/2009
CN    101902790 A    12/2010
(Continued)

OTHER PUBLICATIONS

International Search Report of PCT Application No. PCT/CN2017/118014 dated Sep. 12, 2018, (4p).
(Continued)

*Primary Examiner* — Matthew C Sams
(74) *Attorney, Agent, or Firm* — Arch & Lake LLP

(57) ABSTRACT

The present disclosure relates to a cell access method including: in the process that a terminal accesses a first cell, reporting, by a terminal, its own moving speed to a base station corresponding to the first cell; and if the base station determines that the terminal is not allowed to access the first cell according to the moving speed, sending, by the base station, access rejection indication information to the terminal and selecting, by the terminal, according to the access rejection indication information, a second cell in a second network for access. In response to determining, by the base station, that the terminal is not allowed to access the first cell, the terminal can only access the second cell in the second network.

8 Claims, 6 Drawing Sheets

(51) Int. Cl.
*H04W 76/10* (2018.01)
*H04W 4/02* (2018.01)
*H04W 48/08* (2009.01)
*H04W 74/08* (2009.01)

(52) U.S. Cl.
CPC ....... *H04W 74/0833* (2013.01); *H04W 76/10* (2018.02); *H04W 76/27* (2018.02)

(58) Field of Classification Search
CPC ... H04W 48/18; H04W 64/006; H04W 48/20; H04W 28/18; H04W 36/0058; H04W 36/04; H04W 36/22; H04W 36/30; H04W 48/08; H04W 48/16; H04W 64/00; H04W 76/18; H04W 76/28; H04W 84/045; H04W 88/02; H04W 88/06; H04W 12/082; H04W 12/084; H04W 24/02; H04W 24/10; H04W 28/0289; H04W 28/08; H04W 36/0005; H04W 36/0061; H04W 36/0066; H04W 36/00837; H04W 36/0085; H04W 36/08; H04W 36/165; H04W 36/20; H04W 36/24; H04W 4/02; H04W 4/029; H04W 40/244; H04W 48/02; H04W 48/10; H04W 48/12; H04W 52/0206; H04W 52/0216; H04W 68/04; H04W 72/0413; H04W 72/042; H04W 72/0433; H04W 72/048; H04W 72/0493; H04W 76/10; H04W 76/20; H04W 8/18; H04W 84/005; H04W 84/042; H04W 84/047; H04W 88/085; H04W 88/10

See application file for complete search history.

(56) References Cited

U.S. PATENT DOCUMENTS

| | | | | |
|---|---|---|---|---|
| 2005/0026619 A1* | 2/2005 | Jha | | H04W 36/32 455/441 |
| 2007/0004413 A1* | 1/2007 | Mahajan | | H04W 48/04 455/441 |
| 2007/0032235 A1* | 2/2007 | Wahl | | H04W 48/08 455/435.2 |
| 2011/0038342 A1 | 2/2011 | Lindskog et al. | | |
| 2011/0130144 A1* | 6/2011 | Schein | | H04L 41/12 455/442 |
| 2011/0201336 A1* | 8/2011 | Garrett | | H04W 36/0066 455/436 |
| 2012/0088495 A1* | 4/2012 | Tsai | | H04W 76/18 455/422.1 |
| 2012/0238252 A1* | 9/2012 | Levitan | | H04W 4/02 455/414.1 |
| 2013/0084869 A1* | 4/2013 | Johansson | | H04W 76/20 455/436 |
| 2013/0171995 A1* | 7/2013 | Fujishiro | | H04W 28/18 455/441 |
| 2014/0066051 A1* | 3/2014 | Xia | | H04W 52/0206 455/422.1 |
| 2015/0016412 A1* | 1/2015 | Horn | | H04W 36/24 370/331 |
| 2015/0208377 A1* | 7/2015 | Han | | H04W 48/20 455/437 |
| 2015/0271789 A1* | 9/2015 | Gao | | H04W 28/0289 370/328 |
| 2016/0057692 A1* | 2/2016 | Geng | | H04W 48/02 370/329 |
| 2019/0380128 A1* | 12/2019 | Park | | H04W 72/0413 |
| 2020/0178162 A1* | 6/2020 | Wallentin | | H04W 48/18 |
| 2020/0351968 A1* | 11/2020 | Yilmaz | | H04W 36/0069 |
| 2021/0044591 A1* | 2/2021 | Ciano | | H04L 63/102 |

FOREIGN PATENT DOCUMENTS

| | | | | |
|---|---|---|---|---|
| CN | 103209450 A | * | 7/2013 | ............ H04W 36/32 |
| CN | 103384410 A | | 11/2013 | |
| CN | 103581886 A | | 2/2014 | |
| CN | 104219730 A | | 12/2014 | |
| WO | WO-2006137779 A1 | * | 12/2006 | ............ H04W 36/32 |
| WO | WO-2010133040 A1 | * | 11/2010 | ............ H04W 48/20 |
| WO | WO-2011134555 A1 | * | 11/2011 | ........ H04W 36/0061 |
| WO | WO-2012150880 A1 | * | 11/2012 | ............ H04W 36/08 |
| WO | 2016137636 A1 | | 9/2016 | |

OTHER PUBLICATIONS

First Office Action of Chinese Application No. 201780002169.2 dated May 13, 2020 and English translation (12p).
Second Office Action of Chinese Application No. 201780002169.2 dated Sep. 11, 2020 and English translation (14p).

* cited by examiner

CELL ACCESS METHOD AND APPARATUS AND STORAGE MEDIUM

CROSS-REFERENCE TO RELATED APPLICATIONS

This application is a national phase application based on PCT/CN2017/118014, filed on Dec. 22, 2017, the entire content of which is incorporated herein by reference for all purposes.

TECHNICAL FIELD

The present disclosure relates to the field of communication technology, and more particularly, to a cell access method and apparatus and a storage medium.

BACKGROUND

At present, in order to improve the communication quality of different types of terminals, an operator may deploy different types of networks for different types of terminals, that is, the operator may set a specified network for a specified type of terminal. For example, in order to improve the communication quality of a terminal on a high-speed railway, in addition to deploying a public LTE (Long Term Evolution) network, the operator deploys a high-speed railway dedicated network dedicated to serving the terminal on the high-speed railway. As the operator deploys many different types of networks at the same time, in addition to being able to access a cell in the specified network, the terminal may access a cell in other networks, which will affect the communication quality of the terminal. Hence, on the case that many types of networks are deployed, how to prevent the terminal from accessing the cell in other networks besides the specified network has become increasingly important.

SUMMARY

In order to solve the problems in the related art, the present disclosure provides a cell access method and apparatus and a storage medium.

According to a first aspect of the present disclosure, a cell access method for applying to a terminal is provided. The method includes:

in the process of accessing a first cell, reporting a moving speed of the terminal to a base station corresponding to the first cell, wherein the first cell is a cell in a first network;

receiving access rejection indication information sent by the base station, wherein the access rejection indication information is sent in response to determining, by the base station, that the terminal is not allowed to access the first cell according to the moving speed; and selecting a second cell from other cells other than the first cell for access according to the access rejection indication information, wherein the second cell is a cell in a second network and is a neighbor cell of the first cell.

According to a second aspect of the present disclosure, a cell access method being applied to a base station is provided. The method includes:

receiving a moving speed reported by a terminal, wherein the moving speed is reported by the terminal in the process of accessing a first cell through the base station, and the first cell is a cell in a first network; and in response to determining that the terminal is not allowed to access the first cell according to the moving speed, sending access rejection indication information to the terminal to instruct the terminal to select a second cell from other cells other than the first cell for access, wherein the second cell is a cell in a second network, and is a neighbor cell of the first cell.

According to a third aspect of the present disclosure, a terminal is provided. The terminal includes:

a processor;

a non-transitory storage coupled to the processor; and a plurality of programs stored in the non-transitory storage that, when executed by the processor, cause the terminal to perform acts:

in the process of accessing a first cell, reporting a moving speed of the terminal to a base station corresponding to the first cell, wherein the first cell is a cell in a first network;

receiving access rejection indication information sent by the base station, wherein the access rejection indication information is sent in response to determining, by the base station, that the terminal is not allowed to access the first cell according to the moving speed; and selecting a second cell from other cells other than the first cell for access according to the access rejection indication information, wherein the second cell is a cell in a second network and is a neighbor cell of the first cell.

According to a fourth aspect of the present disclosure, a base station is provided. The base station includes:

a processor; and a non-transitory storage coupled to the processor; and a plurality of programs stored in the non-transitory storage that, when executed by the processor, cause the base station to perform acts comprising:

receiving a moving speed reported by a terminal, wherein the moving speed is reported by the terminal in the process of accessing a first cell through the base station, and the first cell is a cell in a first network; and in response to determining that the terminal is not allowed to access the first cell according to the moving speed, sending access rejection indication information to the terminal to instruct the terminal to select a second cell from other cells other than the first cell for access, wherein the second cell is a cell in a second network, and is a neighbor cell of the first cell.

According to a fifth aspect of the present disclosure, a computer-readable storage medium having stored thereon an instruction is provided. When being executed by a processor, implements steps of any method according to the first aspect.

According to a sixth aspect of the present disclosure, a computer-readable storage medium having stored thereon an instruction is provided. When being executed by a processor, implements steps of any method according to the second aspect.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

Figure 1:
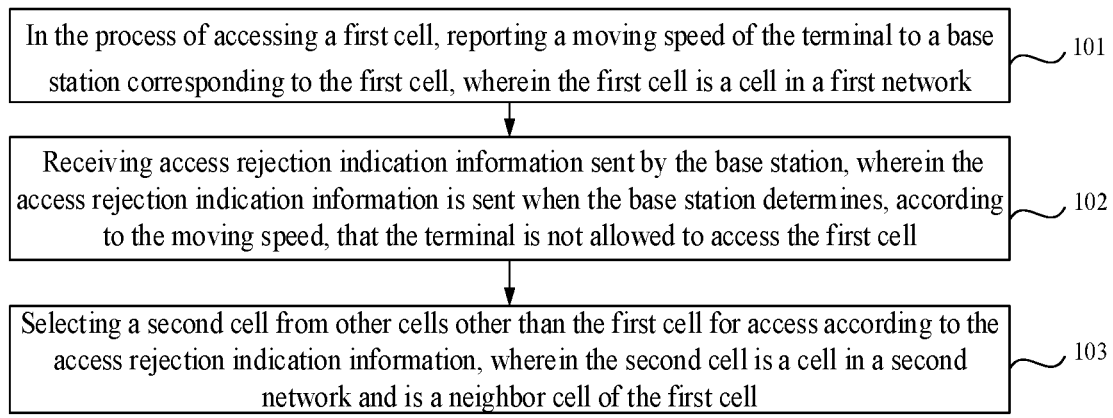
FIG. 1 is a flow chart of a cell access method according to an embodiment of the present disclosure.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the disclosure as recited in the appended claims.

An application scenario of embodiments of the present disclosure is introduced firstly before the embodiments of the present disclosure are explained in detail. In order to improve the communication quality of a specified type of terminal in the related art, an operator provides many different types of networks. As a result, in addition to being able to access a cell in a specified network, the terminal may access a cell in other networks besides the specified network, which will affect the communication quality of the terminal. For example, the operator deploys both a public LTE network, and a high-speed railway dedicated network dedicated to serving the terminal on the high-speed railway. However, in practical application, in addition to being able to access the high-speed railway dedicated network, the terminal on the high-speed railway may access the public LTE network. When the terminal on the high-speed railway accesses the public LTE network, the communication quality of the terminal on the high-speed railway is affected.

Therefore, an embodiment of the present disclosure provides a cell access method. In the method, a base station corresponding to a first cell may determine, according to a moving speed reported by a terminal, whether the terminal is allowed to access the first cell; and if it is determined that the terminal is not allowed to access the first cell, the terminal can only access a second cell in a second network. Thus, the terminal is prevented from accessing a cell in other networks besides the second network.

Nouns involved in embodiments of the present disclosure are explained next.

Random access: random access is a way in which a terminal accesses a cell, that is, the terminal may access certain cell in a random access way.

A random access process mainly includes the following several steps.

(1) When the terminal needs to access certain cell, the terminal sends a preamble sequence to a base station corresponding to the cell. The preamble sequence is a sequence randomly selected by the terminal and may be called a message 1.

(2) When detecting the preamble sequence, the base station determines a random access response message corresponding to the preamble sequence, and sends a message 2 to the terminal. The message 2 carries the preamble sequence and the random access response message for the preamble sequence.

(3) When detecting the preamble sequence and the random access response message for the preamble sequence in the message 2, the terminal sends an RRC connection request to the base station. The RRC connection request is also called a message 3.

(4) When receiving the RRC connection request sent by the terminal, the base station sends an RRC connection setup message to the terminal to instruct the terminal to set up an RRC connection with the base station. The RRC connection setup message is also called a message 4.

(5) When receiving the RRC connection setup message sent by the base station, the terminal sets up an RRC connection with the base station, and returns an RRC connection setup complete message to the base station. The RRC connection setup complete message is also called a message 5.

RRC connection release message: after the terminal sets up the RRC connection with the base station, when the base station determines that it needs to release the RRC connection with the terminal, the base station may send an RRC connection release message to the terminal, so that the terminal releases the RRC connection with the base station.

FIG. 1 is a flow chart of a cell access method according to an embodiment of the present disclosure. The method is applied to a terminal and, as show in FIG. 1, includes the following steps.

In step 101, in the process of accessing a first cell, a moving speed is reported to a base station corresponding to the first cell, wherein the first cell is a cell in a first network.

In step 102, access rejection indication information sent by the base station is received, wherein the access rejection indication information is sent when the base station determines, according to the moving speed, that the terminal is not allowed to access the first cell.

In step 103, a second cell is selected from other cells other than the first cell for access according to the access rejection indication information, wherein the second cell is a cell in a second network, and is a neighbor cell of the first cell.

In the embodiment of the present disclosure, in the process that the terminal accesses the first cell, the terminal reports its own moving speed to the base station corresponding to the first cell; if the base station determines that the terminal is not allowed to access the first cell according to the moving speed the base station sends the access rejection indication information to the terminal; and the terminal can select a first cell in the second network for access according to the access rejection indication information. As the first cell is the cell in the first network, by means of the cell access method according to the embodiment of the present disclosure, the base station corresponding to the first cell may determine whether the terminal is allowed to access the first cell according to the moving speed of the terminal; and if it is determined that the terminal is not allowed to access the first cell, the terminal can only access the second cell in the second network. Thus, the terminal is prevented from accessing a cell in other networks besides the second network.

In one or more embodiments, the step that in the process of accessing the first cell, the moving speed is reported to the base station corresponding to the first cell includes:

a preamble sequence is sent to the base station; and when a random access response message sent by the base station based on the preamble sequence is received, an RRC connection request is sent to the base station, wherein the RRC connection request carries the moving speed.

In one or more embodiments, the step that access rejection indication information sent by the base station is received includes:

an RRC connection setup message sent by the base station based on the RRC connection request is received, wherein the RRC connection setup message carries the access rejection indication information.

In one or more embodiments, the step that in the process of accessing the first cell, the moving speed is reported to the base station corresponding to the first cell includes:

a preamble sequence is sent to the base station;

after a random access response message sent by the base station based on the preamble sequence is received, an RRC connection request is sent to the base station; and when an RRC connection setup message sent by the base station based on the RRC connection request is received, an RRC connection with the base station is set up, and an RRC connection setup complete message is sent to the base station, wherein the RRC connection setup complete message carries the moving speed.

In one or more embodiments, the step that access rejection indication information sent by the base station is received includes:

an RRC connection release message sent by the base station is received, wherein the RRC connection release message carries the access rejection indication information.

In one or more embodiments, the access rejection indication information includes an access rejection reason, wherein the access rejection reason is that the current speed does not match.

In one or more embodiments, the access rejection indication information includes an identifier of the second cell.

In one or more embodiments, the step that the second cell is selected from other cells other than the first cell for access according to the access rejection indication information includes:

the second cell is selected from other cells other than the first cell for access according to the identifier of the second cell.

All of the above optional technical solutions may form the optional embodiment of the present disclosure in any combined manner which is not described herein.

Figure 2:
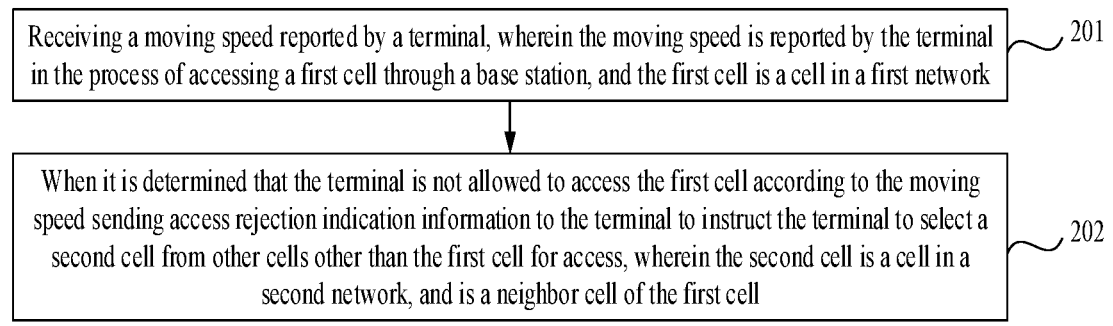
FIG. 2 is a flow chart of another cell access method according to an embodiment of the present disclosure.

FIG. 2 is a flow chart of another cell access method according to an embodiment of the present disclosure. The method is applied to a base station, as show in FIG. 2, includes the following steps.

In step 201, a moving speed reported by a terminal is received, wherein the moving speed is reported by the terminal in the process of accessing a first cell through the base station, and the first cell is a cell in a first network.

In step 202, when it is determined that the terminal is not allowed to access the first cell according to the moving speed access rejection indication information is sent to the terminal to instruct the terminal to select a second cell from other cells other than the first cell for access, wherein the second cell is a cell in a second network, and is a neighbor cell of the first cell.

In the embodiment of the present disclosure, after the base station receives the moving speed reported by the terminal in the process of accessing the first cell, if the base station determines that the terminal is not allowed to access the first cell according to the moving speed the base station sends the access rejection indication information to the terminal; and the terminal can select a first cell in the second network for access according to the access rejection indication information. As the first cell is the cell in the first network, by means of the cell access method according to the embodiment of the present disclosure, the base station corresponding to the first cell may determine whether the terminal is allowed to access the first cell according to the moving speed of the terminal; and if it is determined that the terminal is not allowed to access the first cell, the terminal can only access the second cell in the second network. Thus, the terminal is prevented from accessing a cell in other networks besides the second network.

In one or more embodiments, the step that the moving speed reported by the terminal is received includes:

a preamble sequence sent by the terminal is received, and a random access response message is sent to the terminal based on the preamble sequence; and an RRC connection request sent by the terminal is received, wherein the RRC connection request carries the moving speed.

In one or more embodiments, the step that when it is determined that the terminal is not allowed to access the first cell according to the moving speed access rejection indication information is sent to the terminal includes:

when the moving speed is greater than a preset speed, it is determined that the terminal is not allowed to access the first cell; and an RRC connection setup message is sent to the terminal, wherein the RRC connection setup message carries the access rejection indication information.

In one or more embodiments, the step that the moving speed reported by the terminal is received includes:

a preamble sequence sent by the terminal is received, and a random access response message is sent to the terminal based on the preamble sequence;

an RRC connection request sent by the terminal is received, and an RRC connection setup message is sent to the terminal based on the RRC connection request; and an RRC connection setup complete message sent by the terminal is received, wherein the RRC connection setup complete message carries the moving speed.

In one or more embodiments, the step that when it is determined that the terminal is not allowed to access the first cell according to the moving speed access rejection indication information is sent to the terminal includes:

when the moving speed is greater than a preset speed, it is determined that the terminal is not allowed to access the first cell; and an RRC connection release message is sent to the terminal, wherein the RRC connection release message carries the access rejection indication information.

In one or more embodiments, the access rejection indication information includes an access rejection reason, wherein the access rejection reason is that the current speed does not match.

In one or more embodiments, the access rejection indication information includes an identifier of the second cell.

In one or more embodiments, the method further includes the following steps before the step that the access rejection indication information is sent to the terminal:

system messages of all neighbor cells of the first cell are acquired, wherein the system message of each neighbor cell carries a corresponding identifier of the cell and a type of a corresponding network to which the cell belongs; and a cell, which belongs to the second network, is selected from all the neighbor cells of the first cell according to the type of the network to which each neighbor cell belongs, and the selected cell is determined as the second cell.

All of the above optional technical solutions may form the optional embodiment of the present disclosure in any combined manner which is not described herein.

It can be seen from the embodiments of FIG. 1 and FIG. 2 that in the process that the terminal accesses the first cell, the terminal may report its own moving speed to the base station in different scenarios, that is, the cell access method according to the embodiments of the present disclosure may be applied to the different scenarios. The following two embodiments will explain the cell access method in the different scenarios respectively.

Figure 3:
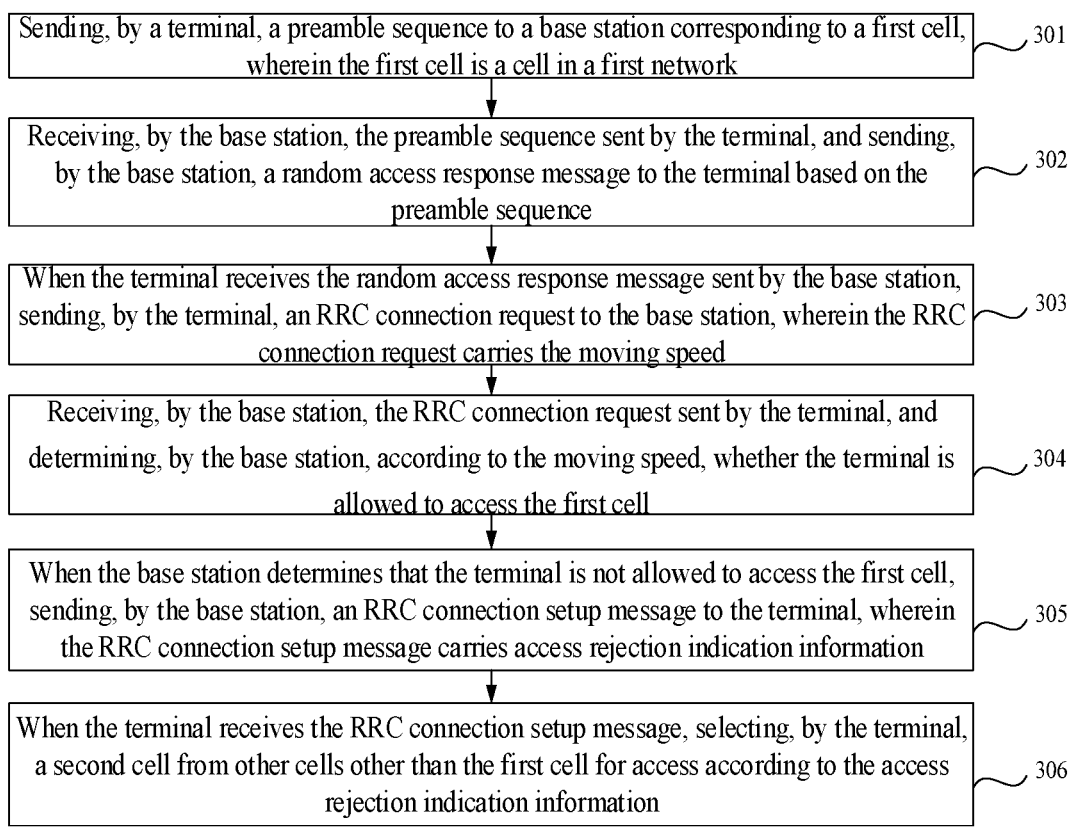
FIG. 3 is a flow chart of a further cell access method according to an embodiment of the present disclosure.

FIG. 3 is a flow chart of a further cell access method according to an embodiment of the present disclosure. The method is applied to such a scenario that in the process that a terminal randomly accesses a first cell, the terminal reports its own moving speed to a base station when the terminal sends an RRC connection request to the base station. As shown in FIG. 3, the method includes the following steps.

In step 301, the terminal sends a preamble sequence to a base station corresponding to a first cell, wherein the first cell is a cell in a first network.

In the embodiment of the present disclosure, as the terminal usually accesses certain cell in a random access way, the terminal reports its own moving speed to the base station corresponding to the first cell in the process of accessing the first cell, that is, the terminal reports its own moving speed to the base station in the process of random access.

In one possible implementation mode, the terminal may report its own moving speed to the base station through steps 301-303 in the process of random access.

It can be seen from five steps included in the process of random access above that when the terminal needs to access the first cell, the terminal needs to send the preamble sequence to the base station firstly so as to indicate that the terminal needs to randomly access the first cell currently.

In step 302, the base station receives the preamble sequence sent by the terminal, and sends a random access response message to the terminal based on the preamble sequence.

When receiving the preamble sequence sent by the terminal, the base station determines that the terminal needs to access the first cell currently. At this time, the base station allocates an available uplink resource to the terminal according to a current network status, and determines a random access response message corresponding to the preamble sequence according to the determined uplink resource. After determining the random access response message, the base station sends the random access response message to the terminal.

In step 303, when receiving the random access response message sent by the base station, the terminal sends an RRC connection request to the base station, wherein the RRC connection request carries the moving speed.

When the terminal receives the random access response message, in order to further ensure to access the first cell, the terminal needs to send an RRC connection request to the base station. At this time, in order to prevent the terminal from accessing other networks besides a specified network, the terminal may carry the moving speed in the RRC connection request.

That is, the terminal carries its own moving speed in the message 3 in the process of random access.

Further, before the terminal sends the RRC connection request to the base station, the terminal needs to determine its own moving speed. An implementation mode in which the terminal determines its own moving speed may be as follows: the terminal may determine a current location through GPS (Global Positioning System) positioning technology at an interval of preset duration, calculate, according to the determined location, a distance that the terminal moves within the preset duration, and take the quotient between the distance and the preset duration as the moving speed of the terminal.

In addition, the preset duration is a duration set in advance and may be 5 s, 10 s, 30 s or the like.

In step 304, the base station receives the RRC connection request sent by the terminal, and determines, according to the moving speed, whether the terminal is allowed to access the first cell.

When the base station receives the RRC connection request, since the RRC connection request carries the moving speed of the terminal, the base station may determine, according to the moving speed, whether the terminal is allowed to access the first cell.

In one possible implementation mode, when the moving speed is greater than a preset speed, the base station determines that the terminal is not allowed to access the first cell. At this time, the base station prevents the terminal from accessing the first cell through step 305 below.

Correspondingly, when the moving speed is greater than the preset speed, the base station determines that the terminal is allowed to access the first cell. At this time, the base station may set up an RRC connection with the terminal by directly sending an RRC connection setup message to the terminal.

The preset speed is a speed set in advance, and may be 150 km/h, 200 km/h, 300 km/h or the like. In addition, the preset speed is information preconfigured by an OAM (Operate, Administrator, and Manage) system, that is, the base station may acquire the preset speed from the OAM system.

For example, the first network is a public LTE network, the first cell is a cell in the public LTE network, the moving speed of the terminal itself is 300 km/h, and the preset speed is 200 km/h. At this time, when the base station receives the moving speed carried in the RRC connection request, since the moving speed of 300 km/h being greater than the preset speed of 200 km/h indicates that the terminal may be on a high-speed railway currently, at this time, in order to prevent the terminal from accessing the first cell in the public LTE network, the base station determines that the terminal is not allowed to access the first cell.

In step 305, when determining that the terminal is not allowed to access the first cell, the base station sends an RRC connection setup message to the terminal, wherein the RRC connection setup message carries access rejection indication information.

When the base station determines that the terminal is not allowed to access the first cell through step 304, at this time, in order to prevent the terminal from accessing the first cell, the base station may carry the access rejection indication information in the RRC connection setup message when sending the RRC connection setup message to the terminal.

Further, the access rejection indication information further includes an access rejection reason, and the access rejection reason is that the current speed does not match, so that when receiving the access rejection indication information, the terminal determines that it fails to access the first cell due to its current moving speed.

Further, when the base station determines that the terminal is not allowed to access the first cell, it indicates that the terminal is not suitable for accessing the cell in the first network. At this time, in order to ensure the communication quality of the terminal, the base station may include an identifier of a second cell in the access rejection indication information. That is, the access rejection indication information includes the identifier of the second cell.

The second cell is a cell in a second network, and is a neighbor cell of the first cell. As the second cell is the cell in the second network, the terminal may select the second cell in the second network for access according to the identifier of the second cell.

At this time, as the access rejection indication information includes the identifier of the second cell, the base station needs to acquire the identifier of the second cell before sending the access rejection indication information to the terminal.

The implementation mode in which the base station acquires the identifier of the second cell may be as follows: the base station acquires system messages of all neighbor cells of the first cell, wherein the system message of each neighbor cell carries a corresponding identifier of the cell and a type of a corresponding network to which the cell belongs; and the base station selects a cell, which belongs to the second network, from all the neighbor cells of the first cell according to the type of the network to which each neighbor cell belongs, and determines the selected cell as the second cell.

The base station may acquire the system message of the neighbor cell through an X2 interface between this base station and a base station corresponding to the neighbor cell of the first cell (i.e., an interface between base stations), or through an S1 interface between this base station and a core network (i.e., an interface between the base station and the core network) or may acquire the system message of the neighbor cell from the OAM system, which is not specifically limited in the embodiment of the present disclosure.

In addition, an identifier of a cell is configured to uniquely identify this cell. For example, an identifier of the cell may be cell ID (identification).

For example, the first cell is a cell in a public LTE network. At this time, the base station may determine neighbor cells of the first cell, and determine a cell, which is selected from the neighbor cells and belongs to a high-speed railway dedicated network, as the second cell.

In step 306, when receiving the RRC connection setup message, the terminal selects a second cell from other cells other than the first cell for access according to the access rejection indication information.

When the terminal receives the RRC connection setup message, since the RRC connection setup message carries the access rejection indication information, the terminal may determine that it cannot access the first cell currently. At this time, the terminal needs to reselect a cell for access.

Further, when the access rejection indication information further includes an identifier of the second cell, the terminal may select the second cell from other cells other than the first cell for access according to the identifier of the second cell. Since the second cell is the cell in the second network, by means of the above cell access method, the terminal with a high speed is prevented from accessing the first network.

For example, the first cell is a cell in a public LTE network, the moving speed of the terminal itself is 300 km/h, and the preset speed is 200 km/h. At this time, by means of the cell access method according to the embodiment of the present disclosure, the terminal may be prevented from accessing the cell in the public LTE network. As the terminal may be located on the high-speed railway currently, the terminal on the high-speed railway may be prevented from accessing the cell in the public LTE network.

In the embodiment of the present disclosure, in the process that the terminal accesses the first cell, the terminal reports its own moving speed when sending the RRC connection request to the base station corresponding to the first cell; if the base station determines that the terminal is not allowed to access the first cell according to the moving speed the base station sends the access rejection indication information to the terminal; and the terminal can select a first cell in the second network for access according to the access rejection indication information. As the first cell is the cell in the first network, by means of the cell access method according to the embodiment of the present disclosure, the base station corresponding to the first cell may determine whether the terminal is allowed to access the first cell according to the moving speed of the terminal; and if it is determined that the terminal is not allowed to access the first cell, the terminal can only access the second cell in the second network. Thus, the terminal is prevented from accessing a cell in other networks besides the second network.

Figure 4:
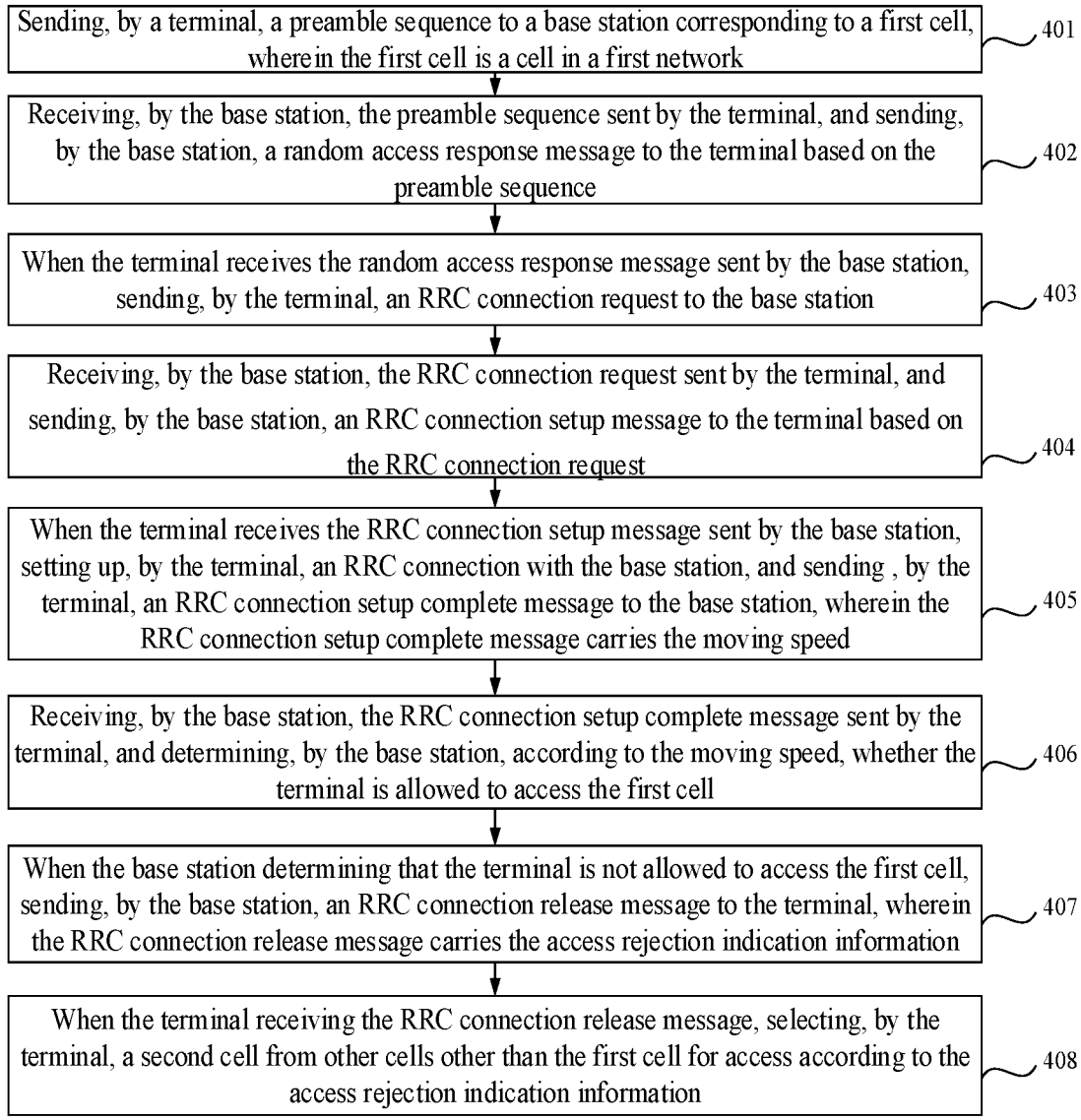
FIG. 4 is a flow chart of a still further cell access method according to an embodiment of the present disclosure.

FIG. 4 is a flow chart of a still further cell access method according to an embodiment of the present disclosure. The method is applied to such a scenario that in the process that a terminal randomly accesses a first cell, the terminal reports its own moving speed to a base station when the terminal sends an RRC connection setup complete message to the base station. As shown in FIG. 4, the method may include the following steps.

In step 401, the terminal sends a preamble sequence to a base station corresponding to a first cell, wherein the first cell is a cell in a first network.

The implementation mode of step 401 is basically the same as that of step 301 in the embodiment of FIG. 3, and is not described in detail herein.

In step 402, the base station receives the preamble sequence sent by the terminal, and sends a random access response message to the terminal based on the preamble sequence.

The implementation mode of step 402 is basically the same as that of step 302 in the embodiment of FIG. 3, and is not described in detail herein.

In step 403, when receiving the random access response message sent by the base station, the terminal sends an RRC connection request to the base station.

This step is different from step 303 in FIG. 3 in that when receiving the random access response message sent by the base station, the terminal only sends an ordinary RRC connection request to the base station, that is, the RRC connection request does not carry the moving speed of the terminal.

That is, in the embodiment of the present disclosure, the terminal does not carry its own moving speed in the message 3 in the process of random access.

In step 404, the base station receives the RRC connection request sent by the terminal, and sends an RRC connection setup message to the terminal based on the RRC connection request.

As the terminal does not carry its own moving speed in the RRC connection request, when receiving the RRC connection request, the base station may send an RRC connection setup message to the terminal directly based on the RRC connection request.

In step 405, when receiving the RRC connection setup message sent by the base station, the terminal sets up an RRC connection with the base station, and sends an RRC connection setup complete message to the base station, wherein the RRC connection setup complete message carries the moving speed.

As the base station sends the RRC connection setup message according to the RRC connection request which does not carry the moving speed, when receiving the RRC connection setup message sent by the base station, the terminal may directly set up the RRC connection with the base station, and sends the RRC connection setup complete message to the base station after RRC connection setup completion.

As the message sent by the terminal to the base station at last time in the process of random access is the RRC connection setup complete message, if the terminal does not report its own moving speed to the base station in first several steps of random access, at this time, in order to prevent the terminal from accessing other networks besides a specified network, the terminal needs to report its own moving speed to the base station in this step. That is, the terminal carries its own moving speed in the RRC connection setup complete message when sending the RRC connection setup complete message to the base station.

That is, in the embodiment of the present disclosure, the terminal reports its own moving speed to the base station in the message 5.

In addition, before reporting its own moving speed to the base station, the terminal needs to determine its own moving speed. The implementation mode in which the terminal determines its own moving speed may refer to step 303 in the embodiment of FIG. 3, and is not described in detail herein.

In step 406, the base station receives the RRC connection setup complete message sent by the terminal, and determines, according to the moving speed, whether the terminal is allowed to access the first cell.

As the RRC connection setup complete message carries the moving speed of the terminal, the base station may determine, according to the moving speed, whether the terminal is allowed to access the first cell.

The implementation mode in which the base station determines, according to the moving speed, whether the terminal is allowed to access the first cell may refer to step 304 in the embodiment of FIG. 3.

In step 407, when determining that the terminal is not allowed to access the first cell, the base station sends an RRC connection release message to the terminal, wherein the RRC connection release message carries the access rejection indication information.

As the RRC connection between the terminal and the base station has been set up successfully at this time, if the base station determines at this time that the terminal is not allowed to access the first cell, the base station may release the RRC connection with terminal by sending the RRC connection release message to the terminal only.

Further, like step 305 in the embodiment of FIG. 3, the access rejection indication information includes an access rejection reason, wherein the access rejection reason is that the current speed does not match.

Further, like step 305 in the embodiment of FIG. 3, the access rejection indication information includes an identifier of the second cell.

Correspondingly, if the base station determines, according to the moving speed, that the terminal is allowed to access the first cell, at this time, the base station does not need to send the RRC connection release message to the terminal.

In step 408, when receiving the RRC connection release message, the terminal selects a second cell from other cells other than the first cell for access according to the access rejection indication information.

When the terminal receives the RRC connection release message sent by the base station, it indicates that the base station needs to release the RRC connection which has been set up. At this time, the terminal may release the RRC connection.

After the terminal releases the RRC connection, in order to ensure the communication quality of the terminal, the terminal needs to select a second cell from other cells other than the first cell for access according to the access rejection indication information so as to continue with a communication service.

The implementation mode in which the terminal selects a second cell from other cells other than the first cell for access according to the access rejection indication information may refer to step 306 in the embodiment of FIG. 3, and is not described in detail herein.

In the embodiment of the present disclosure, in the process that the terminal accesses the first cell, the terminal reports its own moving speed when sending the RRC connection setup complete message to the base station corresponding to the first cell; if the base station determines that the terminal is not allowed to access the first cell according to the moving speed the base station sends the access rejection indication information to the terminal; and the terminal can select a first cell in the second network for access according to the access rejection indication information. As the first cell is the cell in the first network, by means of the cell access method according to the embodiment of the present disclosure, the base station corresponding to the first cell may determine whether the terminal is allowed to access the first cell according to the moving speed of the terminal; and if it is determined that the terminal is not allowed to access the first cell, the terminal can only access the second cell in the second network. Thus, the terminal is prevented from accessing a cell in other networks besides the second network.

Figure 5:
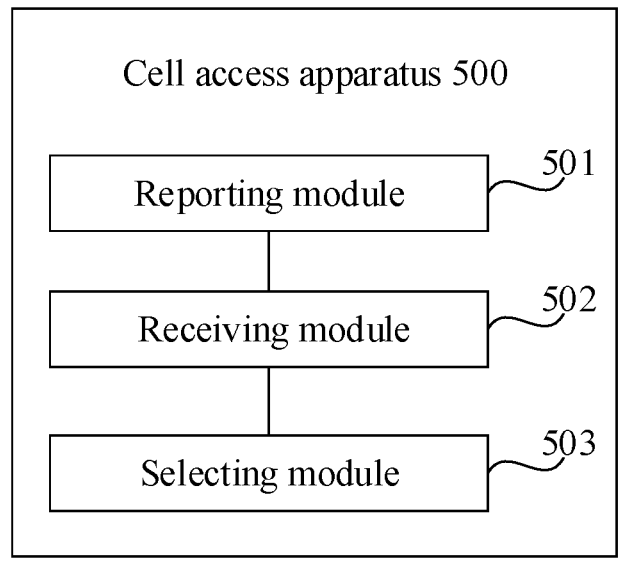
FIG. 5 is a block diagram of a cell access apparatus according to an embodiment of the present disclosure.

FIG. 5 is a block diagram of a cell access apparatus 500 according to an embodiment of the present disclosure. The cell access apparatus is applied to a terminal. With reference to FIG. 5, the apparatus includes a reporting module 501, a receiving module 502, and a selecting module 503.

The reporting module 501 is configured to report a moving speed to a base station corresponding to a first cell in the process of accessing the first cell, wherein the first cell is a cell in a first network.

The receiving module 502 is configured to receive access rejection indication information sent by the base station, wherein the access rejection indication information is sent when the base station determines, according to the moving speed, that the terminal is not allowed to access the first cell.

The selecting module 503 is configured to select a second cell from other cells other than the first cell for access according to the access rejection indication information, wherein the second cell is a cell in a second network, and is a neighbor cell of the first cell.

In one or more embodiments, the reporting module 501 is specifically configured to:

send a preamble sequence to the base station; and when receiving a random access response message sent by the base station based on the preamble sequence, send an RRC connection request to the base station, wherein the RRC connection request carries the moving speed.

In one or more embodiments, the receiving module 502 is specifically configured to:

receive an RRC connection setup message sent by the base station based on the RRC connection request, wherein the RRC connection setup message carries the access rejection indication information.

In one or more embodiments, the reporting module 501 is specifically configured to:

send a preamble sequence to the base station; and after receiving a random access response message sent by the base station based on the preamble sequence, send an RRC connection request to the base station; and when receiving an RRC connection setup message sent by the base station based on the RRC connection request, set up an RRC connection with the base station, and send an RRC connection setup complete message to the base station, wherein the RRC connection setup complete message carries the moving speed.

In one or more embodiments, the receiving module 502 is specifically configured to:

receive an RRC connection release message sent by the base station, wherein the RRC connection release message carries the access rejection indication information.

In one or more embodiments, the access rejection indication information includes an access rejection reason, and the access rejection reason is that the current speed does not match.

In one or more embodiments, the access rejection indication information includes an identifier of the second cell.

In one or more embodiments the selecting module 503 is specifically configured to:

select the second cell from other cells other than the first cell for access according to the identifier of the second cell.

In the embodiment of the present disclosure, in the process that the terminal accesses the first cell, the terminal reports its own moving speed to the base station corresponding to the first cell; if the base station determines that the terminal is not allowed to access the first cell according to the moving speed the base station sends the access rejection indication information to the terminal; and the terminal can select a first cell in the second network for access according to the access rejection indication information. As the first cell is the cell in the first network, by means of the cell access apparatus according to the embodiment of the present disclosure, the base station corresponding to the first cell may determine whether the terminal is allowed to access the first cell according to the moving speed of the terminal; and if it is determined that the terminal is not allowed to access the first cell, the terminal can only access the second cell in the second network. Thus, the terminal is prevented from accessing a cell in other networks besides the second network.

With regard to the apparatus in the aforesaid embodiment, the specific manner in which the respective modules perform the operations has been described in detail in embodiments of the methods, and will not be explained in detail herein.

Figure 6:
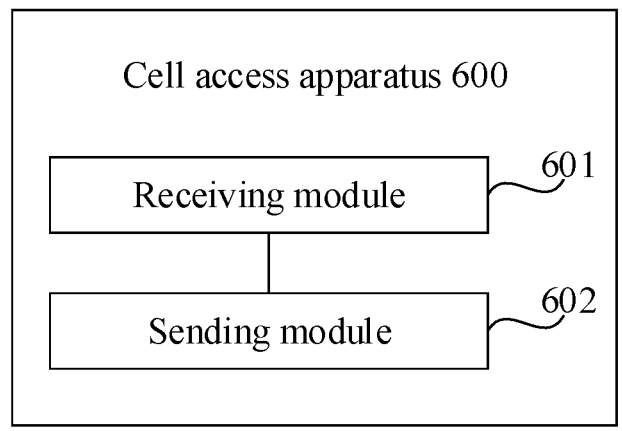
FIG. 6 is a block diagram of another cell access apparatus according to an embodiment of the present disclosure.

FIG. 6 is a block diagram of another cell access apparatus 600 according to an embodiment of the present disclosure. The cell access apparatus is applied to a base station. With reference to FIG. 6, the apparatus includes a receiving module 601 and sending module 602.

The receiving module 601 is configured to receive a moving speed reported by a terminal, wherein the moving speed is reported by the terminal in the process of accessing a first cell through the base station, and the first cell is a cell in a first network.

The sending module 602 is configured to: when it is determined that the terminal is not allowed to access the first cell according to the moving speed send access rejection indication information to the terminal to instruct the terminal to select a second cell from other cells other than the first cell for access, wherein the second cell is a cell in a second network, and is a neighbor cell of the first cell.

In one or more embodiments, the receiving module 601 is specifically configured to:

receive a preamble sequence sent by the terminal, and send a random access response message to the terminal based on the preamble sequence; and receive an RRC connection request sent by the terminal, wherein the RRC connection request carries the moving speed.

In one or more embodiments, the sending module 602 is specifically configured to:

when the moving speed is greater than a preset speed, determine that the terminal is not allowed to access the first cell; and send an RRC connection setup message to the terminal, wherein the RRC connection setup message carries the access rejection indication information.

In one or more embodiments, the receiving module 601 is specifically configured to:

receive a preamble sequence sent by the terminal, and send a random access response message to the terminal based on the preamble sequence;

receive an RRC connection request sent by the terminal, and send an RRC connection setup message to the terminal based on the RRC connection request; and receive an RRC connection setup complete message sent by the terminal, wherein the RRC connection setup complete message carries the moving speed.

In one or more embodiments, the sending module 602 is specifically configured to:

when the moving speed is greater than a preset speed, determine that the terminal is not allowed to access the first cell; and send an RRC connection release message to the terminal, wherein the RRC connection release message carries the access rejection indication information.

In one or more embodiments, the access rejection indication information includes an access rejection reason, and the access rejection reason is that the current speed does not match.

In one or more embodiments, the access rejection indication information includes an identifier of the second cell.

In one or more embodiments, the apparatus 600 further includes:

an acquiring module configured to acquire system messages of all neighbor cells of the first cell, wherein the system message of each neighbor cell carries a corresponding identifier of the cell and a type of a corresponding network to which the cell belongs; and a selecting module configured to select a cell, which belongs to the second network, from all the neighbor cells of the first cell according to the type of the network to which each neighbor cell belongs, and determine the selected cell as the second cell.

In the embodiment of the present disclosure, after the base station receives the moving speed reported by the terminal in the process of accessing the first cell, if the base station determines that the terminal is not allowed to access the first cell according to the moving speed the base station sends the access rejection indication information to the terminal; and the terminal can select a first cell in the second network for access according to the access rejection indication information. As the first cell is the cell in the first network, by means of the cell access apparatus according to the embodiment of the present disclosure, the base station corresponding to the first cell may determine whether the terminal is allowed to access the first cell according to the moving speed of the terminal; and if it is determined that the terminal is not allowed to access the first cell, the terminal can only access the second cell in the second network. Thus, the terminal is prevented from accessing a cell in other networks besides the second network.

With regard to the apparatus in the aforesaid embodiment, the specific manner in which the respective modules perform the operations has been described in detail in embodiments of the methods, and will not be explained in detail herein.

Figure 7:
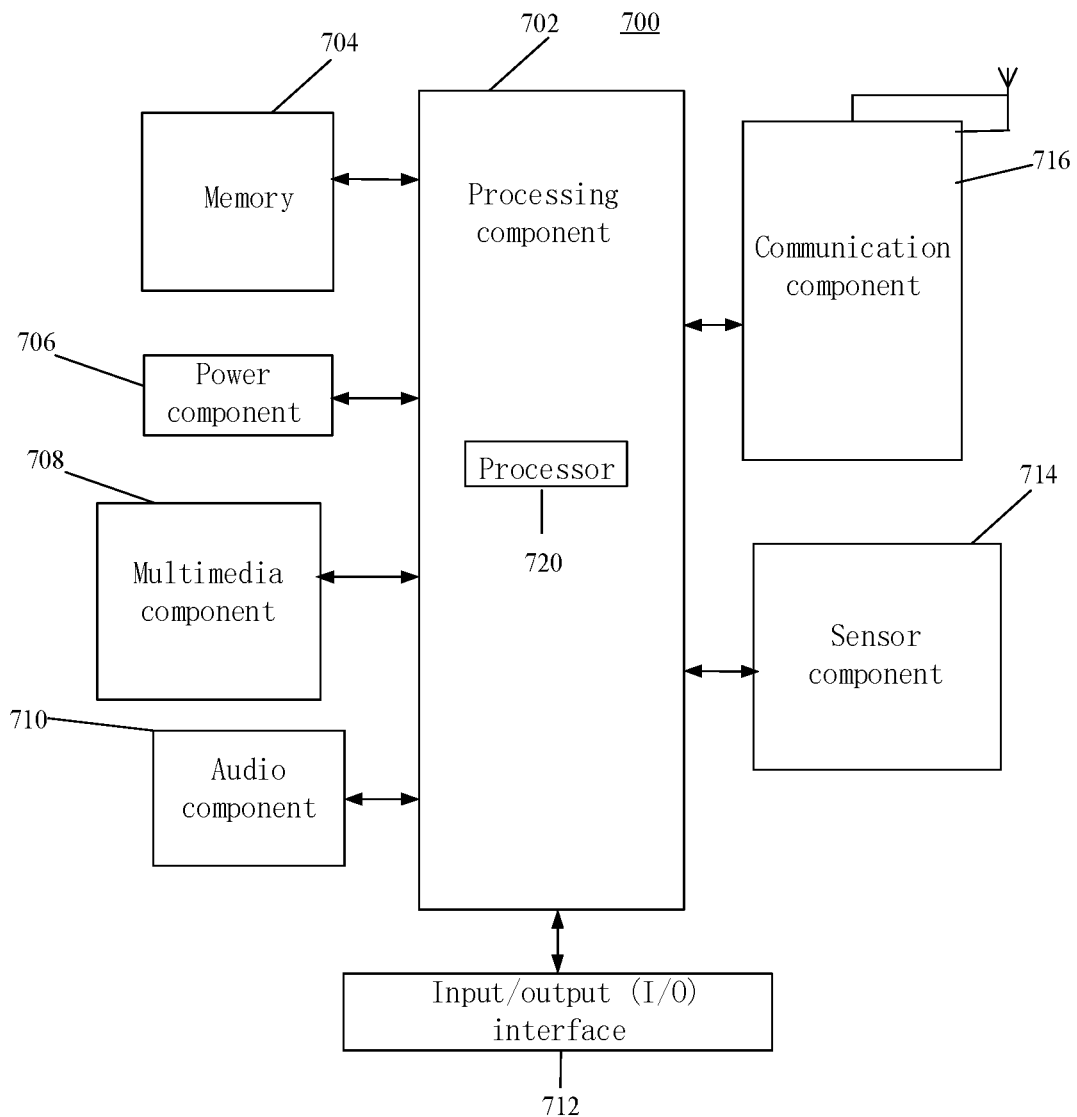
FIG. 7 is a block diagram of a further cell access apparatus according to an embodiment of the present disclosure.

FIG. 7 is a block diagram of a further cell access apparatus 700 according to an embodiment of the present disclosure. The apparatus 700 is applied to any terminal needing to access a cell. The terminal may be a mobile phone, a computer, a message transceiving device, a game console, a tablet device, a medical device, a fitness device or the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, videos, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 708 includes a front camera and/or a rear camera. The front camera and the rear camera may receive external multimedia data while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive external audio signals when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons may include, but are not limited to, a home button, a volume button, a start button, and a lock button.

The sensor component 714 includes one or more sensors to provide status assessments of various aspects of the apparatus 700. For instance, the sensor component 714 may detect an on/off status of the apparatus 700, relative positioning of components, e.g., the display device and the mini keyboard of the apparatus 700, and the sensor component 714 may also detect a position change of the apparatus 700 or a component of the apparatus 700, presence or absence of user contact with the apparatus 700, orientation or acceleration/deceleration of the apparatus 700, and temperature change of the apparatus 700. The sensor component 714 may include a proximity sensor configured to detect the presence of nearby objects without any physical contact. The sensor component 714 may also include a light sensor, such as a CMOS or CCD image sensor, used for imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 2G, or 3G, or a combination thereof. In an exemplary embodiment, the communication component 716 receives broadcast signals or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 704 including instructions, executable by the processor 620 in the apparatus 700, for performing the above-described methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a terminal, the terminal can be caused to execute the above cell access method provided by the embodiments of the present disclosure.

An embodiment of the present disclosure provides a computer program product including instructions. When the computer program product runs on a terminal, the terminal can be caused to execute the above cell access method provided by the embodiments.

An embodiment of the present disclosure provides a computer program product including instructions. When the computer program product runs on a terminal, the terminal can be caused to execute the above cell access method provided by the embodiments.

Figure 8:
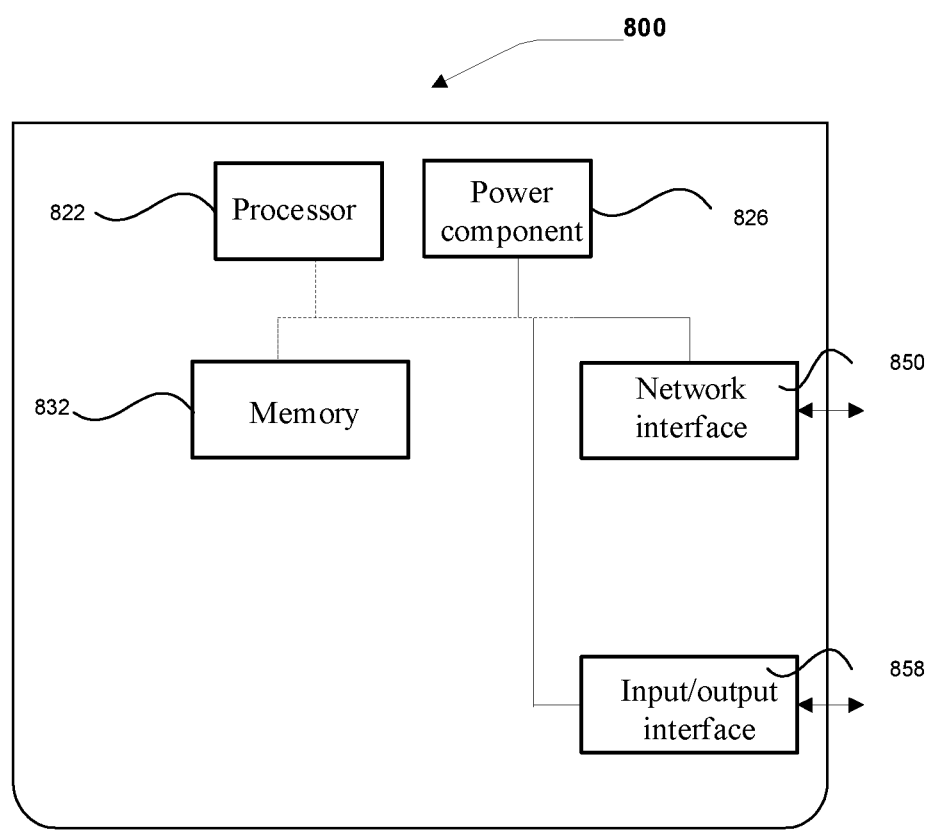
FIG. 8 is a block diagram of a still further cell access apparatus according to an embodiment of the present disclosure.

FIG. 8 is a block diagram of a cell access apparatus according to an embodiment of the present disclosure. The apparatus is applied in a base station. With reference to FIG. 8, the apparatus 800 may include a processor 822 including one or more processors and memory resources represented by a memory 832 for storing instructions executable by the processor 822, for example an application program. The application program stored in the memory 832 may include one or more modules, each of which corresponds to a set of instructions. Further, the processor 822 is configured to execute instructions to perform the above cell access method provided by the embodiments.

The apparatus 800 may further include a power component 826 for performing power management for the apparatus 800, a wired or wireless network interface 850 configured for connecting the apparatus 800 to a network, and an input/output interface 858. The apparatus 800 can operate an operating system stored in the memory 832, such as Windows Server™, Mac OS X™, Unix™, Linux™, FreeBSD™ or the like.

In exemplary embodiments, a non-transitory computer readable storage medium including instructions is also provided, such as the memory 832 including instructions, executable by the processor 822 in the apparatus 800, for performing the above-described methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a base station, the base station can be caused to execute the above cell access method provided by the embodiments of the present disclosure.

An embodiment of the present disclosure provides a computer program product including instructions. When the computer program product runs on a base station, the base station can be caused to execute the above cell access method provided by the embodiments of the present disclosure.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

The invention claimed is:

1. A cell access method, comprising:
in the process of accessing a first cell in a first network, reporting, by a terminal, a moving speed of the terminal to a base station corresponding to the first cell by:
sending, by the terminal, a preamble sequence to the base station; and
in response to receiving a random access response message sent by the base station based on the preamble sequence, sending, by the terminal, a radio resource control (RRC) connection request to the base station, wherein the RRC connection request carries the moving speed;
receiving, by the terminal, access rejection indication information sent by the base station by:
receiving, by the terminal, an RRC connection setup message sent by the base station based on the RRC connection request, the RRC connection setup message carrying the access rejection indication information, wherein the access rejection indication information is sent in response to determining, by the base station, that the terminal is not allowed to access the first cell according to the moving speed; and
selecting, by the terminal, a second cell from other cells other than the first cell for access according to the access rejection indication information, wherein the second cell is a cell in a second network and is a neighbor cell of the first cell.

2. The method according to claim 1, wherein the access rejection indication information comprises an identifier of the second cell.

3. The method according to claim 2, wherein selecting, by the terminal, the second cell from other cells other than the first cell for access according to the access rejection indication information comprises:
selecting, by the terminal, the second cell from other cells other than the first cell for access according to the identifier of the second cell.

4. A terminal, comprising:
a processor;
a non-transitory storage coupled to the processor; and
a plurality of programs stored in the non-transitory storage that, when executed by the processor, cause the terminal to perform acts comprising:
in the process of accessing a first cell in a first network, reporting a moving speed of the terminal to a base station corresponding to the first cell by:
sending, by the terminal, a preamble sequence to the base station; and
in response to receiving a random access response message sent by the base station based on the preamble sequence, sending, by the terminal, a radio resource control (RRC) connection request to the base station, wherein the RRC connection request carries the moving speed;

receiving access rejection indication information sent by the base station by:
  receiving, by the terminal, an RRC connection setup message sent by the base station based on the RRC connection request, the RRC connection setup message carrying the access rejection indication information, wherein the access rejection indication information is sent in response to determining, by the base station, that the terminal is not allowed to access the first cell according to the moving speed; and
  selecting a second cell from other cells other than the first cell for access according to the access rejection indication information, wherein the second cell is a cell in a second network and is a neighbor cell of the first cell.

5. The terminal according to claim 4, wherein the access rejection indication information comprises an identifier of the second cell.

6. The terminal according to claim 5, wherein selecting the second cell from other cells than the first cell for access according to the access rejection indication information comprises:
  selecting the second cell from other cells other than the first cell for access according to the identifier of the second cell.

7. A base station, comprising:
a processor;
a non-transitory storage coupled to the processor; and
a plurality of programs stored in the non-transitory storage that, when executed by the processor, cause the base station to perform acts comprising:
receiving a moving speed reported by a terminal by:
  receiving a preamble sequence sent by the terminal, and sending a random access response message to the terminal based on the preamble sequence; and
  receiving a radio resource control (RRC) connection request sent by the terminal, the RRC connection request carrying the moving speed, wherein the moving speed is reported by the terminal in the process of accessing a first cell through the base station, and the first cell is a cell in a first network; and
in response to determining that the terminal is not allowed to access the first cell according to the moving speed, sending access rejection indication information to the terminal to instruct the terminal to select a second cell from other cells other than the first cell for access by:
  in response to the moving speed being greater than a preset speed, determining that the terminal is not allowed to access the first cell; and
sending an RRC connection setup message carrying the access rejection indication information to the terminal, wherein the second cell is a cell in a second network, and is a neighbor cell of the first cell.

8. The base station according to claim 7, wherein the plurality of programs stored in the non-transitory storage cause the base station to perform acts further comprising:
  acquiring system messages of all neighbor cells of the first cell, wherein each system message of each neighbor cell carries a corresponding identifier of the neighbor cell and a type of a corresponding network to which the cell belongs; and
  selecting a cell belonging to the second network from all the neighbor cells of the first cell according to the type of the network to which each neighbor cell belongs, and determining the selected cell as the second cell.

* * * * *